United States Patent [19]

Luepertz

[11] 4,408,457

[45] Oct. 11, 1983

[54] MECHANICALLY CONTROLLABLE BRAKE BOOSTER

[75] Inventor: Hans-Henning Luepertz, Darmstadt, Fed. Rep. of Germany

[73] Assignee: ITT Industries, Inc., New York, N.Y.

[21] Appl. No.: 237,541

[22] Filed: Feb. 23, 1981

[30] Foreign Application Priority Data

Mar. 31, 1980 [DE] Fed. Rep. of Germany ....... 3012455

[51] Int. Cl.³ .................... B60T 13/00; F15B 9/10; F01B 31/00
[52] U.S. Cl. .................... 60/547.1; 91/369 A; 91/376 R; 92/107
[58] Field of Search ............ 91/369 A, 369 B, 376 R; 92/93, 98 D, 165 R, 165 PR, 99, 166, 107; 60/547 R, 554

[56] References Cited

U.S. PATENT DOCUMENTS

| | | | |
|---|---|---|---|
| 2,731,534 | 1/1956 | Hansen et al. | 92/93 X |
| 4,338,854 | 7/1982 | Margetts | 92/98 D X |
| 4,347,779 | 9/1982 | Belart | 92/99 X |

FOREIGN PATENT DOCUMENTS

| | | | |
|---|---|---|---|
| 2040376 | 8/1980 | United Kingdom | 91/369 A |
| 2070172 | 9/1981 | United Kingdom | 60/547 R |
| 2072777 | 10/1981 | United Kingdom | 91/369 A |

*Primary Examiner*—Paul E. Maslousky
*Assistant Examiner*—Abram McConnell Bradley, IV
*Attorney, Agent, or Firm*—John T. O'Halloran; Alfred C. Hill

[57] ABSTRACT

To reduce the overall weight of mechanically controlled brake boosters it is known to transmit the axial reaction forces by means of axial draw bars or pipes extending axially within the booster housing. According to the present invention the weight reduction and a decrease in axial length of the brake booster is accomplished having the booster housing shaped like a ring which surrounds and is connected to the maste brake cylinder. The master brake cylinder is fastened to the vehicle splashboard via axial webs extending beyond a lateral wall of the booster housing. A yoke arranged movably between the splashboard and the booster housing contains the valve mechanism and transmits the boosting force from the booster piston (movable wall) to the piston of the master brake cylinder.

45 Claims, 5 Drawing Figures

MECHANICALLY CONTROLLABLE BRAKE BOOSTER

BACKGROUND OF THE INVENTION

The present invention relates to a mechanically controllable brake booster for hydraulic brake systems of automotive vehicles comprising a pressure casing adapted to be attached to a carrier and including at least one piston or movable wall arranged therein which subdivides the pressure casing into a low-pressure chamber and a working chamber and acts via connecting members and a reaction device on a push rod leading to an element receiving the boosted force, preferably a master brake cylinder, adapted to be fastened to the pressure casing, and including further a control rod adapted to be operatively connected to the reaction device to actuate a valve controlling the pressure in the working chamber.

A brake booster of this type is disclosed in copending U.S. application of J. Belart and F. Wienecke, Ser. No. 61,113, filed July 26, 1979, assigned to the same assignee as the present application. In this brake booster, for the purpose of relieving the load or force applied to the walls of the pressure casing and achieving a reduction in weight, there is provided a reinforcement tube extending axially through the pressure casing and carrying at its one end the force-receiving element while its other end serves to secure the brake booster to a carrier member, for instance, the splash-board of a motor vehicle. The piston or movable wall is guided on the outer circumference of the reinforcement tube and carries connecting members extending through slots into the interior of the reinforcement tube, with a control housing accommodating the reaction device and the valve being fastened to the end of the connecting members.

SUMMARY OF THE INVENTION

It is an object of the present invention to provide a brake booster of the type referred to hereinabove which has a low dead weight as a result of favorable force paths, is of straightforward construction and is characterized by a small overall axial length.

A feature of the present invention is the provision of a mechanically controlled brake booster for automotive vehicles comprising a pressure casing including at least one boosting piston disposed therein to subdivide the casing into a low-pressure chamber and a working chamber, the piston acting via a connecting member and a reaction device on a push rod operatively associated with a boosted force-receiving element, the casing being in the form of a ring encircling the force-receiving element and fastened thereto at its inner periphery; a control rod operatively connected to the reaction device to actuate a valve controlling pressure in the working chamber; webs connected to and extending axially from the inner periphery of the casing beyond one lateral wall thereof, the webs securing the casing to a vehicle carrier; and the connecting member includes at least one transmission member disposed parallel to the webs, and a yoke attached to the transmission member extending through the webs.

According to the present invention the transmission of the actuating forces to the carrier, which are introduced into the force-receiving element by the control rod through the reaction device, causes only a tensile strain in the transmission members of the brake booster so that these components may be of a relatively thin and light-weight construction. Further, because of the expansion of the lateral walls of the pressure casing under the action of the working pressure have no effect upon the support of the force-receiving element on the carrier and accordingly do not influence the working travel of the control rod, these may likewise be of relatively thin and, consequently, light-weight construction, with the correspondingly larger expansion being put up with. A favorable overall axial length is accomplished by the parallel arrangement of the webs and transmission members. The transmission members utilize approximately the mounting space required in conventional brake boosters for the neck of the working piston which extends out of the pressure casing. In the brake booster of the present invention, the same axial mounting space accommodates the transmission members and the webs, so that the brake booster of the present invention does not necessitate an additional overall axial length. In contrast hereto, the brake booster of the above-cited copending application requires an extension of the overall axial length by the length of the slots in the reinforcement tube through which the connecting members extend. Another reduction in the overall axial length of the whole arrangement comprising power booster and force-receiving element may be achieved advantageously by arranging for the force-receiving element to extend into the central hollow chamber of the pressure casing where it is fastened to the pressure casing close to the ends of the webs. In this arrangement, pressure casing, webs and force-receiving element are preferably interconnected in a common fastening point which results in a still further simplification.

An advantageous alternative includes the force-receiving element secured to the webs carrying the pressure casing of the brake booster.

In an advantageous improvement of the present invention, the transmission member includes a tube extending coaxially out of the pressure casing and having its inner and outer circumferential surface sealed relative to the pressure casing. Such a transmission member affords a high amount of rigidity and accordingly ensures a good guiding of the piston. In order to keep the lost area of the brake booster small, the transmission member may advantageously include two or more evenly spaced rods. The transmission member advantageously includes channels connecting the chambers of the brake booster to the valve.

In a preferred embodiment of the present invention, the yoke connected to the transmission member forms the housing for the reaction device and the valve. Thereby a compact construction of the brake booster is provided, permitting valve and reaction device to be arranged axially in series in a manner proven in the art. Advantageously, the yoke and the transmission member, which includes a tube, may be integrally formed.

A suitable guiding for the yoke may be accomplished advantageously in that the yoke includes a cylindrical projection engaging into a guide bore of the force-receiving element. The cylindrical projection of the yoke preferably houses the valve and the reaction device. A suitable guiding for the yoke may be further achieved by connecting the push rod rigidly with the piston of the force-receiving element, and by arranging for its end close to the reaction device to engage into a guide bore of the yoke.

The return spring for returning the brake booster into its initial position is preferably arranged between the yoke and an abutment surface of the force-receiving element. By this arrangement, the axial displacement of the yoke caused by the force of the return spring is advantageously limited by a stop provided directly or indirectly at the force-receiving element. This measure eliminates the necessity for a special arrangement to compensate for manufacturing tolerances with respect to the push rod.

In another advantageous embodiment of the present invention, the end of the piston of the force-receiving element extending in the direction of the reaction device provides the push rod. This permits a reduction in the overall axial length of the force-receiving cylinder. Further, the compensating chamber surrounding the piston of the force-receiving element may serve as a guide for the yoke. In this manner, the outwardly sealed sliding surfaces for guiding the yoke are lubricated by the hydraulic fluid.

A further contribution to the reduction in the overall axial length of the brake booster is to guide the valve piston of the valve in a bore of the push rod with a pin extending through the reaction device. This enables the portion of the valve piston lying between control rod and reaction device to be particularly short in an axial direction.

On a further advantageous improvement of the brake booster, two pressure casings arranged axially in series may be provided, each accommodating a piston axially slidable therein, and the transmission member extends through the pressure casing close to the yoke and connects both pistons with one another.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
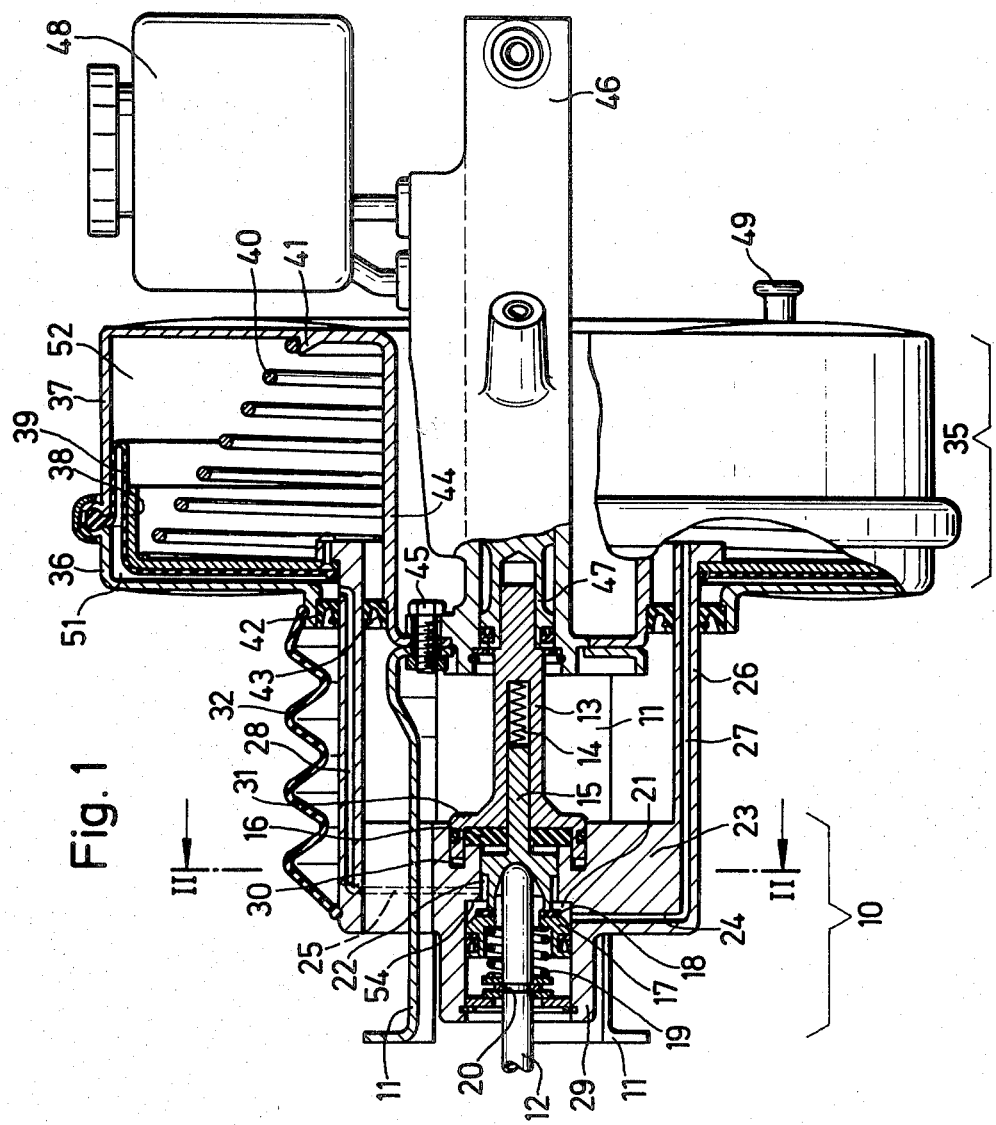
FIG. 1 is a longitudinal cross sectional view of a first embodiment of a brake booster in accordance with the principles of the present invention taken along line I—I of FIG. 2.
Figure 2:
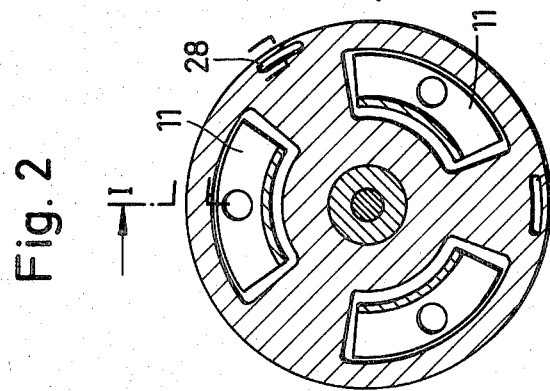
FIG. 2 is a cross section taken along line II—II of FIG. 1.

The brake booster illustrated in FIGS. 1 and 2 is provided for the actuation of hydraulic brake systems in automotive vehicles and utilizes for power amplification a vacuum, for example, the vacuum available in the intake manifold of the vehicle's engine. The brake booster basically includes control section 10 and pressure casing 35 forming a constructional unit with the master brake cylinder 46 and the latter's fluid reservoir 48, which unit is attached to a carrying member of the motor vehicle, preferably to the splashboard, by means of webs 11 shaped like profiled sheet metal strips.

The pressure casing 35 includes a pair of casing sections 36 and 37 and has the form of an annular cylinder. Casing section 36 is provided adjacent working chamber 51 and casing section 37 adjacent low-pressure chamber 52. Located in the interior of casing 35 is piston or movable wall 38 which is sealed relative to the outer wall of pressure casing 35 by means of a rolling diaphragm 39. Rolling diaphragm 39 is clamped between the two casing sections 36 and 37. This eliminates the necessity for a special seal. Piston 38 is urged into its off position by means of spring 40. Spring 40 bears upon cams 41 provided in casing section 37. Extending concentrically relative to the central axis of pressure casing 35 is the cylindrical wall 44 which possesses a mounting flange for attaching pressure casing 35 to webs 11 and master cylinder 46. Movement of piston 38 is transmitted to control section 10 by means of a transmission member. In the embodiment illustrated in FIG. 1, the transmission member is a tube 26. Tube 26 possesses connecting channels 27 and 28. Tube 26 acts through a radial yoke 23 upon the reaction device which includes a rubber disc 16 cooperating with abutment surfaces on yoke 23, valve piston 15 and push rod 13.

Yoke 23 is likewise provided with connecting channels 24 and 25. Annular chamber 22 of the valve is connected to working chamber 51 through connecting bores 25 and 28, while annular chamber 21 is connected to low-pressure chamber 52 through connecting bores 24 and 27. Air is evacuated from low-pressure chamber 52 through fitting 49, resulting in a partial vacuum in this chamber. In the inactive valve position illustrated, the two annular chambers 21 and 22 are interconnected so that a vacuum prevails also in working chamber 51 with the control valve in the off position. Where tube 26 extends into pressure casing 35, low-pressure chamber 52 and working chamber 51 are sealed from the atmosphere by annular seals 43 and 42, respectively.

Valve housing 29 is integrally formed with yoke 23. A valve body 17 and valve piston 15 are arranged in valve housing 29. At its end close to valve piston 15, valve body 17 has a sealing member 18 which in the inactive position illustrated isolates annular chambers 21 and 22 from the atmosphere. Valve body 17 is loaded by a spring 19 bearing against a stop 20 on control rod 12. Operation of control rod 12 by the brake pedal causes it to move to the right when viewing the drawing. Thereby valve piston 15 is likewise shifted to the right, accompanied by movement of valve body 17, until sealing member 18 is in abutment with surface 54. Thereby annular chamber 21 is disconnected from annular chamber 22. Further movement of the brake pedal opens the connection between valve piston 15 and sealing member 18 so that annular chamber 22 is connected to the atmosphere, thus admitting air through connecting channels 25 and 28 to working chamber 51. From this results a pressure differential between low-pressure chamber 52 and working chamber 51. This pressure differential produces a force tending to move piston 38, tube 26 and yoke 23 with valve housing 29 to the right in the drawing.

Yoke 23 acts via rubber disc 16 upon push rod 13. In addition, the force on control rod 12 is transmitted by valve piston 15 to push rod 13 through rubber disc 16. Thus, the two forces are additive in push rod 13, acting as a composite force on piston 47 of master cylinder 46. Rubber disc 16 suitably has a role through which a rod-like extension of valve piston 15 extends into an axial bore of push rod 13 wherein it is guided so that no special guide is necessary. Spring 14 provided in the bore in push rod 13 is of yielding construction and transmits no appreciable forces from valve piston 15 to push rod 13 so that the transmission ratio of the reaction device is not affected. Push rod 13 is guided in a bore of piston 47 of master cylinder 46, thereby eliminating the need for an additional guiding.

Guided via push rod 13 are also yoke 23 and transmission member 26. To this end, the expanded end 31 of push rod 13 engages into a guide bore 30 in yoke 23.

On termination of the braking operation, the brake pedal is released and control rod 12 will move to the left in the drawing. Spring 14 will shift valve piston 15 to the left in the drawing, valve piston 15 will move into abutment with sealing member 18 and displace valve body 17 likewise to the left in the drawing. The connection between low pressure chamber 52 and working chamber 51 will be re-established so that a vacuum is allowed to build up again therein and spring 40 is enabled to return piston 38 into its initial position. Such return movement of spring 40 is assisted by the pressure prevailing in master cylinder 46 at the time. A pleated bellows 32 surrounds the outer surface of tube 26 to protect it against contamination and damage.

Figure 3:
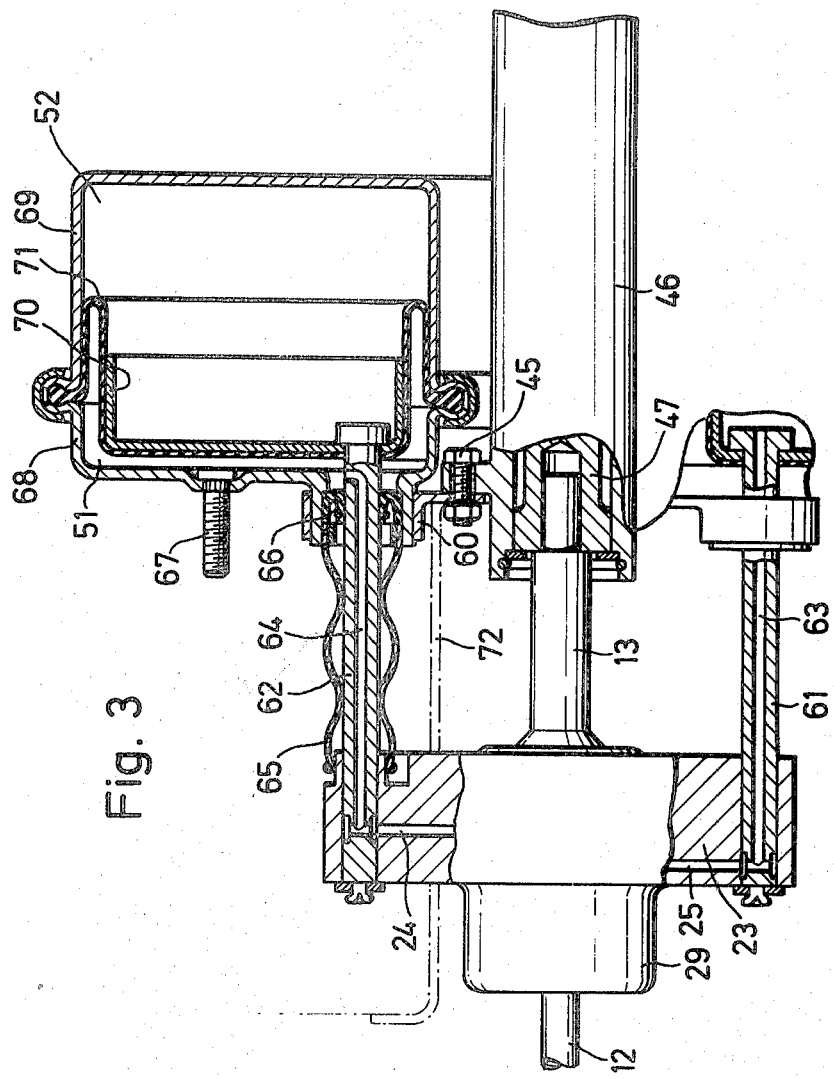
FIG. 3 is a longitudinal cross sectional view of a second embodiment of a brake booster in accordance with the principles of the present invention including a force transmitting member formed by two rods.

In the embodiment of the present invention shown in FIG. 3, the transmission member includes two rods 61 and 62. Three or more rods may also be used. Their number is dictated by the magnitude of the force to be transmitted. Rods 61 and 62 are secured in yoke 23 and have connecting bores 63 and 64 corresponding to the channels 27 and 28 of FIG. 1. Rods 61 and 62 are protected by pleated bellows 65. This is necessary to avoid scratches or the like which might cause damage to or leaks in the seals 66. Pressure casing 35 includes a pair of casing sections 68 and 69 which are interconnected air-tight at their inner and outer cylindrical walls. Provided in casing section 68 are, in addition to the openings for rods 61 and 62, the fastening bolts 67 to fasten the brake booster to the carrier (splashboard). In this embodiment, this is possible without impairing the rigidity of the support of pressure casing 35, because casing section 68 is connected to master cylinder 46 via flange 60 in the immediate vicinity of fastening bolts 67. It is, however, equally advantageous to fasten the brake booster to the carrier by means of axial webs 72.

Piston or movable wall 70 of FIG. 3 is constructed somewhat different from that of FIG. 1. In the embodiment of FIG. 3, rolling diaphragm 71 serves to seal piston 70 on its outer and inner periphery. Parts corresponding to those of FIG. 1 have been assigned like reference numerals.

Figure 4:
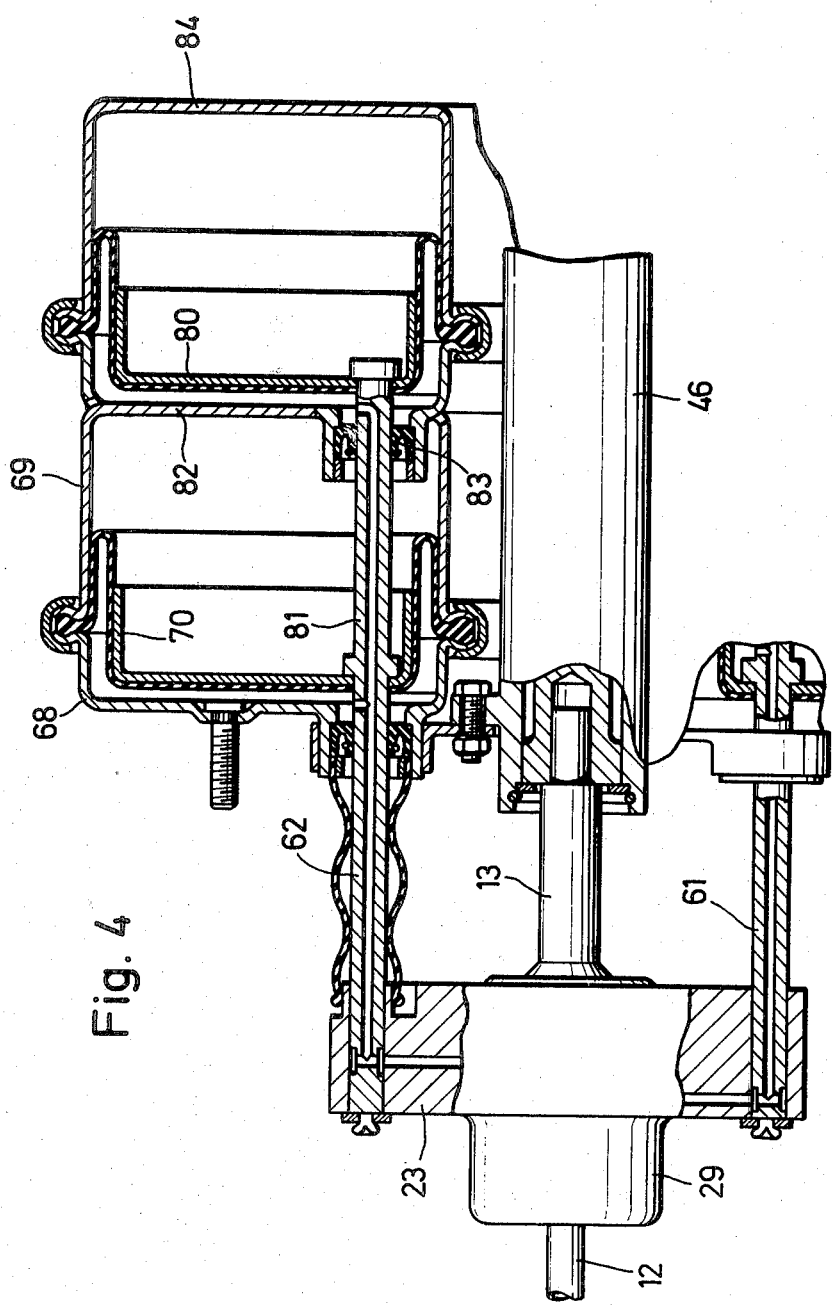
FIG. 4 is a longitudinal cross sectional view of a third embodiment of a brake booster in accordance with the principles of the present invention similar to FIG. 3, but including two pressure casings arranged in series.

The embodiment illustrated in FIG. 3 is also suitable for a tandem device including two pressure casings arranged axially in series. FIG. 4 shows such a construction. Rods 61 and 62 have extended sections 81 leading up to piston or movable wall 80 of a second pressure casing 84.

Sliding seals 83 are provided where sections 81 extend through the center wall 82. Small rolling diaphragms may be substituted for these sliding seals.

Figure 5:
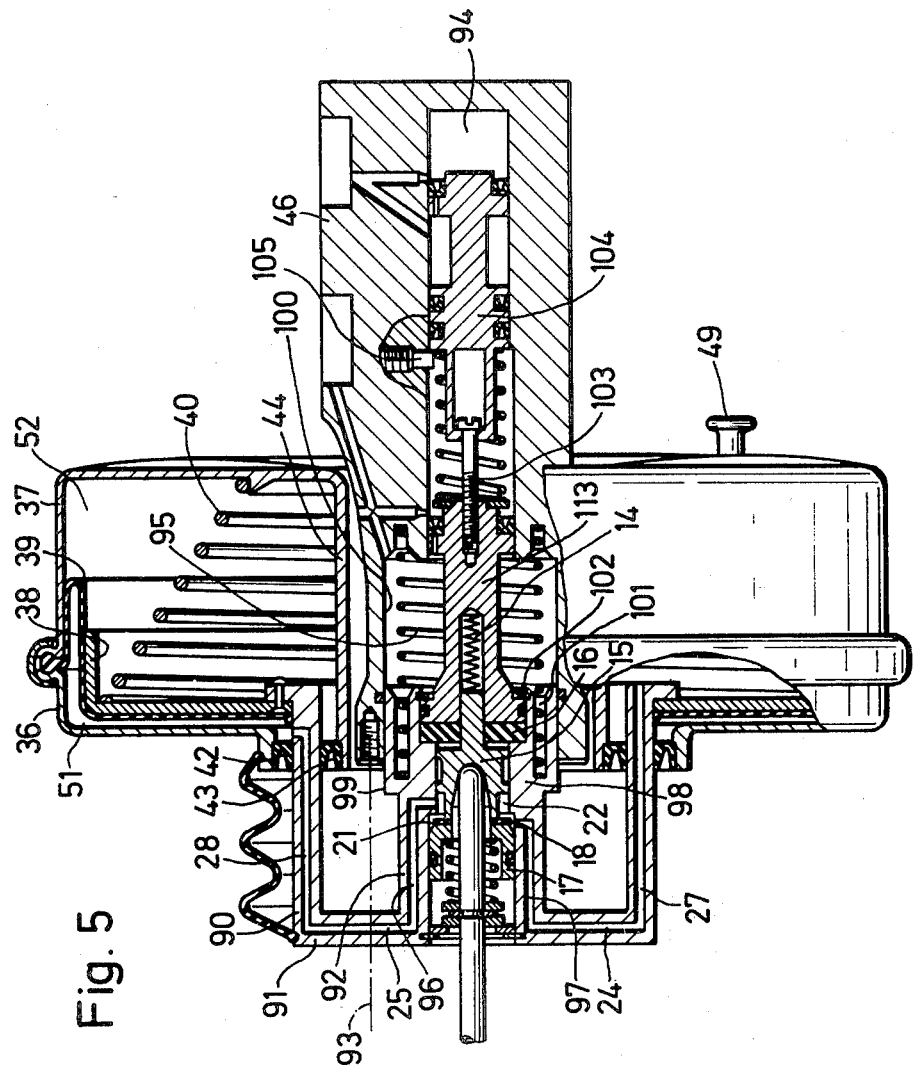
FIG. 5 is a longitudinal cross sectional view of a fourth embodiment of a brake booster in accordance with the principles of the present invention integrally formed with the cylinder of the force-receiving element.

Another embodiment of the present invention is shown in FIG. 5. Parts corresponding to those of FIG. 1 have been assigned like reference numerals. The pressure casing has the same shape as the pressure casing of FIG. 1.

In the embodiment of FIG. 5, the transmission member includes an outer tube 90 which is connected to an inner tube 92 through a radially extending yoke 91. In the upper half of FIG. 5, the connection between working chamber 51 and annular chamber 22 of the valve is shown, this connection including bores 28 in outer tube 90, bore 25 in yoke 91 and bore 96 in inner tube 92.

The lower half of FIG. 5 shows the connection between low-pressure chamber 52 and annular chamber 21 which is established by bore 27 in outer tube 90, bore 24 in yoke 91 and bore 97 in inner tube 92. Rods similar to those of FIG. 3 may be substituted for outer tube 90. Inner tube 92 forms the housing for the valve and the reaction device. End 98 of inner tube 92 is thickened and it has its outer periphery 99 guided in bore or compensating chamber 100 of master brake cylinder 46. Moreover, the thickened end 98 includes an annular groove 101 to receive a spring 95 which is conventionally arranged in chamber 94 of master cylinder 46. In order to prevent spring 95 urging inner tube 92 of the control valve out of bore 100 of master brake cylinder 46, a securing ring 102 is provided which is supported on the push-rod piston 113 which in turn is supported on stop pin 105 of master brake cylinder 46 via bores 103 and piston 104. It is also possible to arrange for inner tube 92 to be supported directly on a stop of the master brake cylinder in a manner herein not shown.

The left end of master brake cylinder 46 is connected to the vehicle by means of tie bolts 93 or webs. In addition, low-pressure casing 35 is connected to master brake cylinder 46. This is not shown in FIG. 5, but an arrangement similar to the one of FIG. 1 may be employed. Also, this variant of the present invention shown in FIG. 5 may be constructed as a tandem arrangement.

While I have described above the principles of my invention in connection with specific apparatus, it is to be clearly understood that this description is made only by way of example and not as a limitation to the scope of my invention as set forth in the objects thereof and in the accompanying claims.

I claim:

1. A mechanically controlled brake booster for automotive vehicles comprising:
    a pressure casing including at least one boosting piston disposed therein to subdivide said casing into a low-pressure chamber and a working chamber, said piston acting via a connecting member and a reaction device on a push rod operatively associated with a master cylinder, said casing being in the form of a ring having an outer periphery and an inner periphery encircling said master cylinder, said casing having said inner periphery fastened to said master cylinder;
    a control rod operatively connected to said reaction device to actuate a valve controlling pressure in said working chamber;
    webs connected to and extending axially from said inner periphery of said casing beyond one lateral wall thereof, said webs securing said casing to a vehicle splashboard; and
    said connecting member includes
        at least one transmission member disposed parallel to said webs, and
        a yoke attached to said transmission member, said yoke extending radially through said webs.
2. A brake booster according to claim 1, wherein said master cylinder extends into a central hollow chamber formed by said inner periphery of said casing and is fastened to said casing adjacent the adjacent end of said webs.

3. A brake booster according to claim 2, wherein said casing and said master cylinder are interconnected at a common fastening point at the adjacent end of said webs.

4. A brake booster according to claim 2, wherein said master cylinder is secured to one end of said webs and has said casing secured thereto.

5. A brake booster according to claim 1 or 2, wherein said transmission member includes a tube extending coaxially out of said casing having its inner and outer circumferential surfaces sealed relative to said casing.

6. A brake booster according to claim 5, wherein said tube includes a first channel connecting said working chamber to said valve and a second channel connecting said low pressure chamber to said valve.

7. A brake booster according to claim 6, wherein said yoke houses said reaction device and said valve.

8. A brake booster according to claim 7, wherein said yoke and said tube are integral.

9. A brake booster according to claim 8, wherein said yoke includes a cylindrical projection extending into and guided by a guide bore of said master cylinder.

10. A brake booster according to claim 9, wherein said cylindrical projection houses said reaction device and said valve.

11. A brake booster according to claim 10, wherein said push rod has one end connected with a piston of said master cylinder and its other end associated with said reaction device, said other end of said push rod being guided in a guide bore of said yoke.

12. A brake booster according to claim 11, further including
a return spring for returning said brake booster to its rest position disposed between said yoke and a surface of said master cylinder.

13. A brake booster according to claim 12, further including
a stop associated with said master cylinder to limit axial displacement of said yoke caused by said return spring.

14. A brake booster according to claim 13, wherein said piston of said master cylinder includes an extension projecting toward said reaction device operating as said push rod.

15. A brake booster according to claim 14, further including
a compensation chamber surrounding said piston of said master cylinder providing a guide for said yoke.

16. A brake booster according to claim 15, wherein said valve includes a valve piston having a portion thereof extending axially through said reaction device and guided in a bore of said push rod.

17. A brake booster according to claim 16, further including
another pressure casing disposed in tandem with said casing surrounding said master cylinder containing therein another boosting piston, and
said transmission member extends through both of said casings to connect both of said boosting pistons together.

18. A brake booster according to claim 5, wherein said yoke houses said reaction device and said valve.

19. A brake booster according to claim 5, wherein said yoke and said tube are integral.

20. A brake booster according to claim 5, wherein said yoke includes a cylindrical projection extending into and guided by a guide bore of said master cylinder.

21. A brake booster according to claim 20, wherein said cylindrical projection houses said reaction device and said valve.

22. A brake booster according to claim 5, wherein said push rod has one end connected with a piston of said master cylinder and its other end associated with said reaction device, said other end of said push rod being guided in a guide bore of said yoke.

23. A brake booster according to claim 5, further including
a return spring for returning said brake booster to its rest position disposed between said yoke and a surface of said master cylinder.

24. A brake booster according to claim 23, further including
a stop associated with said master cylinder to limit axial displacement of said yoke caused by said return spring.

25. A brake booster according to claim 5, wherein a piston of said master cylinder includes an extension projecting toward said reaction device operating as said push rod.

26. A brake booster according to claim 5, further including
a compensation chamber surrounding a piston of said master cylinder providing a guide for said yoke.

27. A brake booster according to claim 5, wherein said valve includes a valve piston having a portion thereof extending axially through said reaction device and guided in a bore of said push rod.

28. A brake booster according to claim 5, further including
another pressure casing disposed in tandem with said casing surrounding said master cylinder containing therein another boosting piston, and
said transmission member extends through both of said casings to connect both of said boosting pistons together.

29. A brake booster according to claim 1 or 2, wherein
said transmission member includes a plurality of evenly spaced rods.

30. A brake booster according to claim 29, wherein one of said plurality of rods includes a first bore connecting said working chamber to said valve, and
another of said plurality of rods includes a second bore connecting said low-pressure chamber to said valve.

31. A brake booster according to claim 30, wherein said yoke houses said reaction device and said valve.

32. A brake booster according to claim 31, wherein said yoke and said tube are integral.

33. A brake according to claim 32, wherein said yoke includes a cylindrical projection extending into and guided by a guide bore of said master cylinder.

34. A brake booster according to claim 33, wherein said cylindrical projection houses said reaction device and said valve.

35. A brake booster according to claim 34, wherein said push rod has one end connected with a piston of said master cylinder and its other end associated with said reaction device, said other end of said push rod being guided in a guide bore of said yoke.

36. A brake booster according to claim 35, further including
a return spring for returning said brake booster to its rest position disposed between said yoke and a surface of said master cylinder.

37. A brake booster according to claim 36, further including
a stop associated with said master cylinder to limit axial displacement of said yoke caused by said return spring.

38. A brake booster according to claim 37, wherein said piston of said master cylinder includes an extension projecting toward said reaction device operating as said push rod.

39. A brake booster according to claim 38, further including
a compensation chamber surrounding said piston of said master cylinder providing a guide for said yoke.

40. A brake booster according to claim 39, wherein said valve includes a valve piston having a portion thereof extending axially through said reaction device and guided in a bore of said push rod.

41. A brake booster according to claim 40, further including
another pressure casing disposed in tandem with said casing surrounding said master cylinder containing therein another boosting piston, and
said transmission member extends through both of said casings to connect both of said boosting pistons together.

42. A brake booster according to claim 29, wherein said yoke houses said reaction device and said valve.

43. A brake booster according to claim 29, wherein said push rod has one end connected with a piston of said master cylinder and its other end associated with said reaction device, said other end of said push rod being guided in a guide bore of said yoke.

44. A brake booster according to claim 29, wherein said valve includes a valve piston having a portion thereof extending axially through said reaction device and guided in a bore of said push rod.

45. A brake booster according to claim 29, further including
another pressure casing disposed in tandem with said casing surrounding said master cylinder containing therein another boosting piston, and
said transmission member extends through both of said casings to connect both of said boosting pistons together.

* * * * *